United States Patent [19]

Gilb

[11] 4,230,416
[45] Oct. 28, 1980

[54] RESTRICTED SLOT NAIL OPENINGS FOR SHEET METAL FRAMING CONNECTORS

[75] Inventor: Tyrell T. Gilb, Berkeley, Calif.

[73] Assignee: Simpson Manufacturing Co., Inc., San Leandro, Calif.

[21] Appl. No.: 84,722

[22] Filed: Oct. 15, 1979

[51] Int. Cl.³ .................... F16B 9/00; E04B 1/38
[52] U.S. Cl. ................. 403/232.1; 113/116 HH; 52/702; 248/300
[58] Field of Search ................ 403/232.1, 237, 235, 403/199, 403, 205; 52/702; 113/116 F, 116 HA, 116 V, 116 Y, 116 HH; 256/67; 72/335; 248/546, 547, 544, 300

[56] References Cited
U.S. PATENT DOCUMENTS

| | | | |
|---|---|---|---|
| 2,413,362 | 12/1946 | Maxwell et al. | 403/403 |
| 2,911,690 | 11/1959 | Sanford | 248/300 X |
| 2,990,590 | 7/1961 | Graveley | 52/702 X |

FOREIGN PATENT DOCUMENTS 1008216 10/1965 United Kingdom .................. 256/67

*Primary Examiner*—Andrew V. Kundrat
*Attorney, Agent, or Firm*—James R. Cypher

[57] ABSTRACT

A metal connector for joining wood members which intersect at an angle less than 90 degrees formed with restricted slot nail openings so that the metal connector can be easily joined to the wood members by inserting the nail fastener into the nail opening at an angle other than a 90 degree angle. The opening has a width slightly larger than the diameter of the nail fastener and a length substantially greater than the diameter of the nail fastener. The nail is inserted into the opening at a selected angle so that the diagonally opposed outer edges of the sides of the opening tangentially register with the opposed sides of the fastener. When the nail is inserted there is little or no relative movement between the nail fastener and the connector.

A method for forming a skewed connector formed with the restricted slotted nail fastener openings.

9 Claims, 9 Drawing Figures

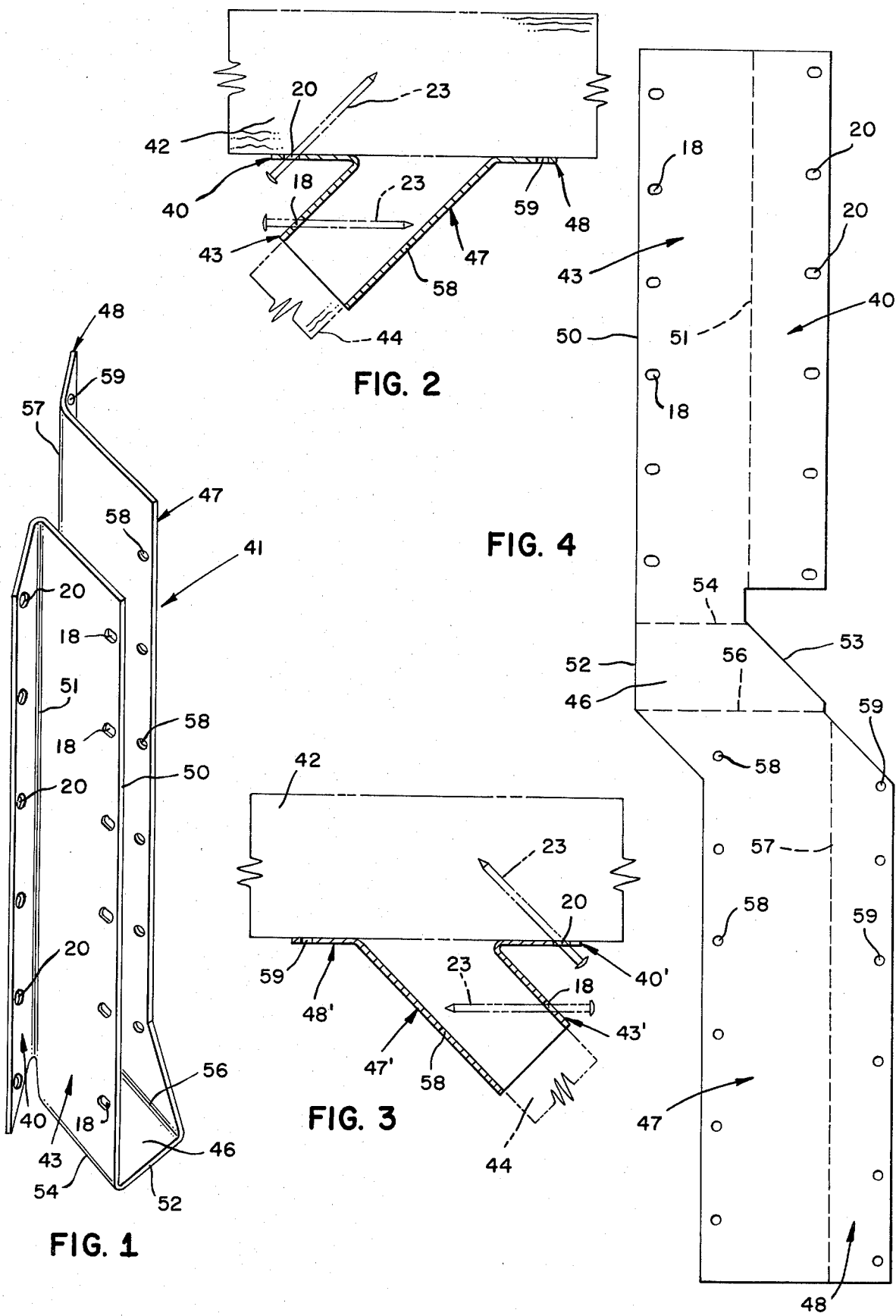

RESTRICTED SLOT NAIL OPENINGS FOR SHEET METAL FRAMING CONNECTORS

BACKGROUND OF THE INVENTION

Prior to the 1940's there were relatively few sheet metal connectors manufactured for joining wood in the construction industry. All such connectors known to Applicant utilized orthogonal nailing. As labor and lumber became more expensive the use of sheet metal connectors such as joist hangers, angles, anchors and bracing became more commonly accepted. In the past twenty years, several major companies have begun producing metal connectors in huge volumes and today, hardly a wood framed building is constructed without the extensive use of these lightweight connectors.

Most wood framing members intersect at right angles and all of the connectors designed for these connections use orthogonal nailing. There has always been a need for metal connectors for connecting wood framing members at angles but even though the metal connectors are easily formed to provide these connections, none have been satisfactory since no one has found a way to satisfactorily nail the metal connectors to the wood framing members. The problem is that there is no way to drive nails through the openings in some parts of the metal connectors because of the lack of space to swing a hammer. Some manufacturers custom manufacture a line of skewed hangers but these are unsatisfactory since they must be made with very wide flanges to permit some nailing of the hanger. Still, nail openings are provided in these hangers in places where it is impossible to drive a nail.

In some of the custom made skewed hangers, it is necessary to either pre-nail the supporting member or the supported member, even though for construction purposes the nailing sequence is contrary to the most convenient construction procedure.

A typical skewed angle connector of the prior art is shown in FIGS. 5 and 6. The connector illustrated is a hanger having a seat 1, parallel sides 2 and 3, a short face member 4 and a long face member 5. The face member 4 is joined to side member 3 at an obtuse angle and the face member 5 is joined to side member 2 at an acute angle. Standard circular nail openings 6 are provided in the face members and side members which require orthogonal nailing.

As shown in FIG. 6 even though nail openings 6 are punched in side 2, it is impossible to actually nail side 2 since there is insufficient space to swing a hammer. Thus, only side 3 can be nailed with nails 7.

Another problem with the connector hanger shown in FIGS. 5 and 6 is the fact that face member 5 must be unusally long in order to be able to nail face member 5 to supporting member 8. Even though more metal is required to form the hanger, the connector is actually unusally weak since the nail openings 6 in face member 5 are a relatively long distance from the end 10 of supported load carrying member 9.

SUMMARY OF THE INVENTION

The connector of the present invention, for the first time, permits wood framing members to be connected at a skewed angle by a metal connector using a construction which permits nails to be driven through the connector and into the wood member.

The gist of the invention is the formation of restricted-slot openings in the metal connector which permits secure fastening by drivng the nail fastener at an angle to the face of the metal connector.

The unique nailing feature of the present connector permits the workman to nail either the supported member or the supporting member in the sequence which is easiest from a construction viewpoint.

The use of the present nailing system will free designers of metal connectors from the restrictions of orthogonal nailing and will open up an entirely new generation of metal connectors which will permit architects and builders to break away from the present orthogonal framing systems.

BRIEF DESCRIPTION OF THE DRAWINGS

FIG. 1 is a perspective view of one form of metal connector here designated as a left skewed hanger illustrating the use of the angular nailing of the present invention.

FIG. 2 is a top plan view of the connector of FIG. 1 attached to wood framing members which are shown in broken line.

FIG. 3 is a top plan view of an alternate form of the invention of FIG. 1 in which the skew angle is reversed and is here designated as a right skewed hanger.

FIG. 4 is a top plan view of the sheet metal blank used to form either the right or left skewed hangers shown in FIGS. 1-3.

DESCRIPTION OF THE PREFERRED EMBODIMENTS

Figures 5, 6:
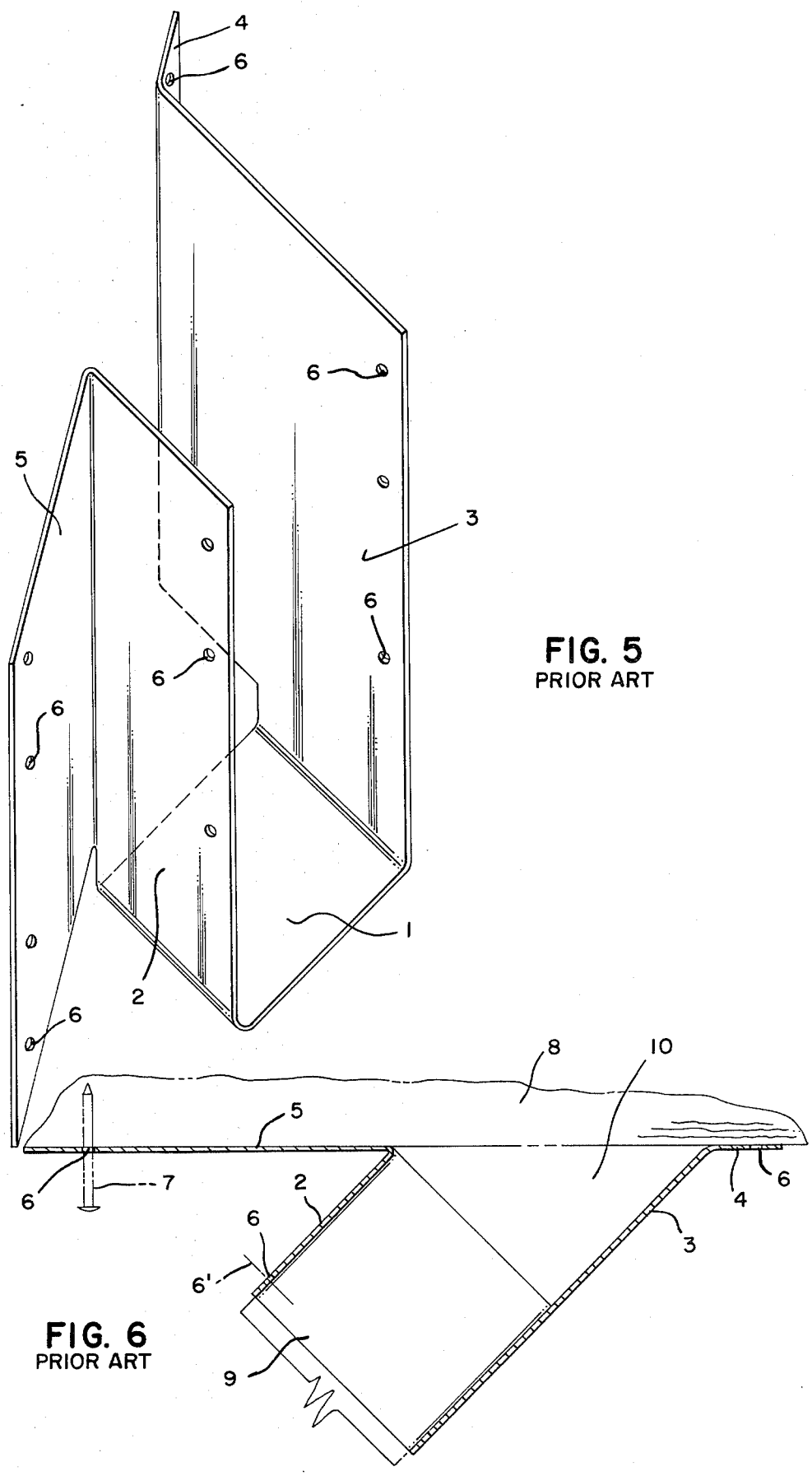
FIG. 5 is a perspective view of a prior art connector with standard orthogonal nailing.
FIG. 6 is a top plan view of the connector of FIG. 5 attached to wood frame members.
Figure 8:
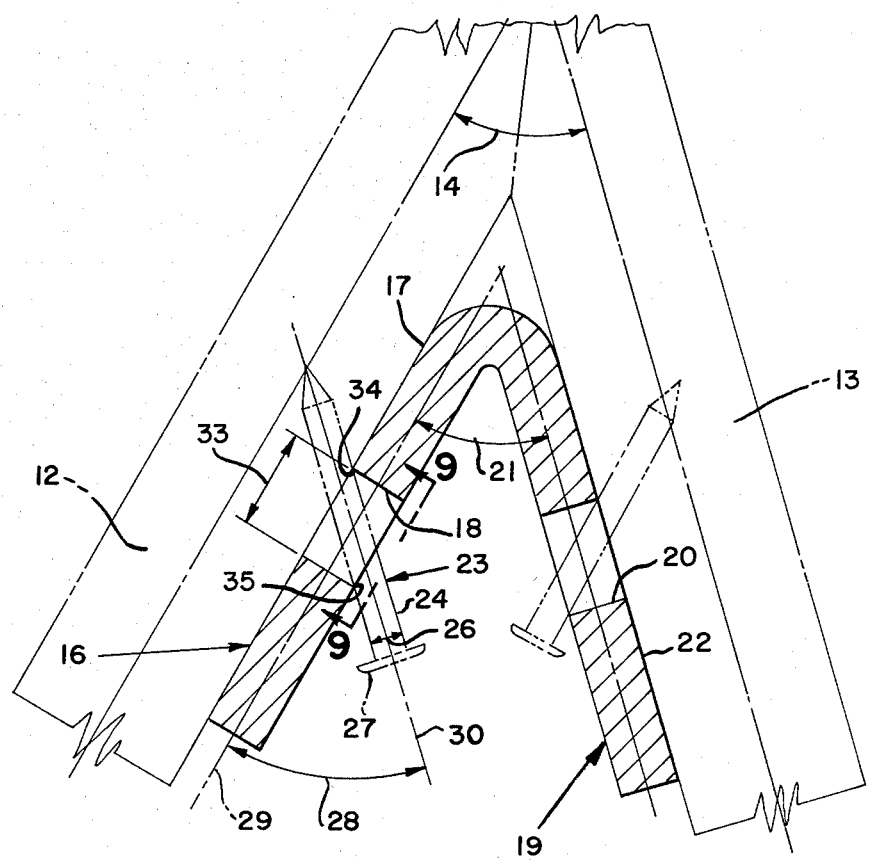
FIG. 8 is a cross sectional view of the connector shown in FIG. 7 taken along line 8—8.
Figure 7:
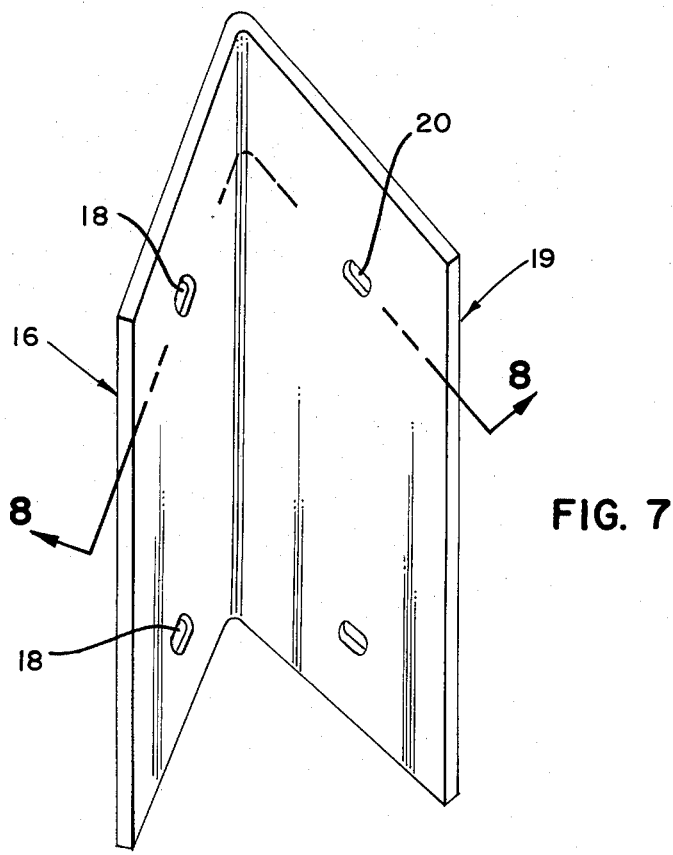
FIG. 7 is a perspective view of an angle connector illustrating another type of connector using the new nailing system.
Figure 9:
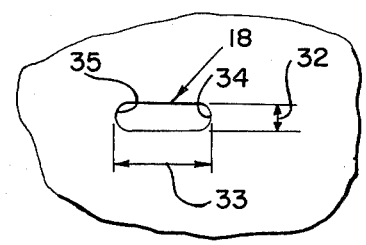
FIG. 9 is a side view of a portion of the connector shown in FIG. 8 taken along line 9—9.

Referring specifically to FIG. 8 of the drawings, the metal connector of the present invention consists of any sheet metal connector which is required to join a first wood member 12 and a second wood member 13 which intersect at an angle 14 of less than 90 degrees. The connector includes a first member 16 having a planar section 17 adapted for flush mounting against the first wood member and is formed with a first restricted slot opening 18 therethrough. A second member 19 is joined to the first member and intersects the first member at an angle 21 less than 90 degrees. A planar section 22 of the second member is adapted for flush mounting against the second wood member.

A first nail fastener 23 having a shank 24 with a uniform diameter 26 and a head 27 is adapted for being driven into the first wood member. The size of the nail depends upon the load to be imposed upon the connector. The nail is driven at a selected angle indicated by the number 28 on the double headed curved line drawn between the center line 29 of the first member and the axis 30 of the fastener.

The first restricted slot opening 18 is formed with a width 32 slightly larger than the diameter 26 of the first nail fastener 23 and a length 33 greater than the diameter of the first nail 23 so that when the first nail is inserted through the first opening the selected angle 28, the diagonally opposed outer edges 34 and 35 of the sides of the first opening tangentially register with the opposed sides of the first fastener and relative movement between the nail fastener and the connector is prevented.

Angle 28 is preferably selected so that nail 23 is driven parallel to second member 19. This enables a hammer to be swung freely to drive the nail through the opening.

Wood framing members are often designed to intersect at a 45 degree angle. Many connectors are designed with a 45 degree angle. The invention, however, applies to all connectors with angles which are less than 90 degrees.

The connector of the present invention could have one member with a width greatly exceeding the width of the other member so that a nail could be driven through a round hole orthogonally to one member and the other member could have a shorter width and a slotted opening so that the nail is driven at an angle. Where, however, the members have generally the same width and the nails must be driven in an angle in order to have room to swing a hammer, the second opening 20 must also be formed in the slotted manner previously described.

The connectors of the present invention require the special slotted nail opening where the distance between the first and second members 16 and 19, measured from the first opening 18 along a line at right angles to the planar section of the first member is less than the length of the first nail fastener.

An example of a connector embodying the restricted slotted opening of the present invention is illustrated in FIG. 1 where the "first member" 40 is the first face member of a hanger 41 adapted for nailing to a supporting member 42 and the "second member" 43 is a first side member adapted for nailing to a supported member 44.

Usually hangers are formed with a seat member 46 which is connected to the first side member and a second side member 47 positioned parallel to the first side member. A second face member 48 is connected to the second side member and is positioned parallel to the first face member.

The skewed hanger may be made using progressive die methods from a flat sheet metal blank as illustrated in FIG. 4. A unique feature is the fact that either a right or a left skewed hanger may be constructed from the same blank by merely bending the metal along the bend lines in different directions. The sheet metal blank as illustrated in FIG. 4 consists of a first side member 43 having a front edge 50. A first face member 40 is connected to the first side member 43. A first straight side-bend line 51 defines a border between the first side panel and the first face panel. A seat member 46 is connected to the first side panel and has a front edge 52 generally parallel to the front edge 50 of the first member. A rear edge 53 is formed at an angle to the front edge. A first seat bend line 54 borders the seat and the first side panel 43. A second seat bend line 56 is spaced from and parallel to the first seat bend line.

A second side member 47 is connected to the seat at the second bend line and is offset from the first side member 43. A second straight side-bend line 57 defines a border between the second side panel 47 and the second face panel 48.

A plurality of slotted openings 18 are punched in the first side member and slotted openings 20 are punched in the first face panel. These slotted openings are constructed as previously described above.

A plurality of circular openings 58 are punched in the second side member and circular openings 59 are punched in the second face member. The side members are then bent along the seat bend lines in the same direction until the side panels are at approximately 90 degrees to the seat member. The face panels are bent along the side-bend lines until the face panels are approximately parallel to each other.

In order to make a right-skewed 45 degree hanger, the first face member is bent up 135 degrees along said first side bend line 51 as viewed in FIG. 4 and the second face member 48 is bent up 45 degrees along the second side bend line 57. The side members are bent down along seat bend lines 54 and 56.

To make a left skewed 45 degree hanger the members are simply bent in the opposite directions as described above, the same number of degrees.

Thus face member 40 becomes face member 40', face member 48 becomes face member 48', side member 43 is now side member 43' and side member 47 is side member 47'. Restricted slot openings 20 are formed in face member 40' and restricted slot openings 18 are formed in side member 43'. Circular openings 59 are punched in face member 48 and circular openings 58 are punched in side member 47'. Nails 23 are driven through the restricted slot openings at the angle as indicated in the drawings.

I claim:

1. A metal connector for joining first and second wood members which intersect at an angle of less than 90 degrees comprising:
   a. a first member having a planar section adapted for flush mounting against said first member formed with a first restricted slot opening therethrough;
   b. a second member joined to said first member and intersecting said first member at an angle less than 90 degrees and having a planar section adapted for flush mounting against said second wood member;
   c. a first nail fastener having a shank with a uniform diameter and a head having a diameter greater than the diameter of said shank, adapted for being driven into said first wood member;
   d. said first nail fastener and said planar section of said first member form a first selected angle; and
   e. said first restricted slot opening is formed with a width slightly larger than the diameter of said first nail fastener and is formed with a length greater than the diameter of said first nail so that when said first nail is inserted through said first restricted slot opening at said first selected angle the diagonally opposed outer edges of the sides of said first restricted slot opening tangentially register with opposed sides of said first fastener and relative movement between said nail fastener and said connector is prevented.

2. A metal connector as described in claim 1 wherein:
   a. said selected angle of said first nail fastener and said second planar section of said second member are generally parallel.

3. A metal connector as described in claim 1 wherein:
   a. said first and second members form approximately a 45 degree angle.

4. A metal connector as described in claim 1 comprising:
   a. a second nail fastener having a shank with a uniform diameter and a head having a diameter greater than the diameter of said shank adapted for being driven into said second wood member;

b. said second nail fastener and said planar section of said second member form a second selected angle;

c. said second member is formed with a second restricted slot opening formed with a width slightly larger than the diameter of said second nail fastener and is formed with a length greater than the diameter of said second nail so that when said second nail is inserted through said second restricted slot opening at said second selected angle the diagonally opposed outer edges of the sides of said first opening tangentially register with opposed sides of said second fastener and relative movement between said nail fastener and said connector is prevented.

5. A metal connector as described in claim 1 wherein:

a. the distance between said first and second members measured from said first opening along a line at right angles to said planar section of said first member is less than the length of said first nail fastener.

6. A metal connector as described in claim 1 wherein:

a. said first member is the first face member of a hanger adapted for nailing to a supporting member; and b. said second member is a first side member of said hanger adapted for nailing to a supported member.

7. A metal connector as described in claim 6 comprising:

a. said connector is formed with a seat member connected to said side member, a second side member connected to said seat member and positioned parallel to said first side member, and a second face member connected to said second side member and positioned parallel to said first face member.

8. A method of forming a skewed hanger comprising:

a. cutting a sheet metal member forming:
(1) a first side member having a front edge,
(2) a first face member connected to said first side member,
(3) a first straight side-bend line defining a border between said first side member and said first face member,
(4) a seat member connected to said first side member having a front edge generally parallel to said front edge of said first side member, a rear edge formed at an angle to said front edge and having a first seat bend line bordering said seat member and said first side member, and a second seat bend line spaced from and parallel to the first seat bend line,
(5) a second side member connected to said seat at said second seat bend line, and offset from said first side member,
(6) a second face member connected to said second side member offset from said first face member,
(7) a second straight side bend line defining a border between said second side member and said second face member;

b. punching a plurality of slotted openings in said first side member and in said first face member;

c. punching a plurality of circular openings in said second side member and in said second face member;

d. bending said side members along said seat bend lines in the same direction until said side members are at approximately 90 degrees to said seat member; and e. bending said face members along said side-bend lines until said face members are approximately parallel to each other.

9. A method of forming a right skewed hanger as described in claim 8 wherein:

a. said slotted openings are formed with a width slightly larger than the diameter of a nail fastener adapted for insertion therethrough and have a length selected so that said nail engages both ends of said slotted opening when driven at a selected angle therethrough.

* * * * *